Figure 3:
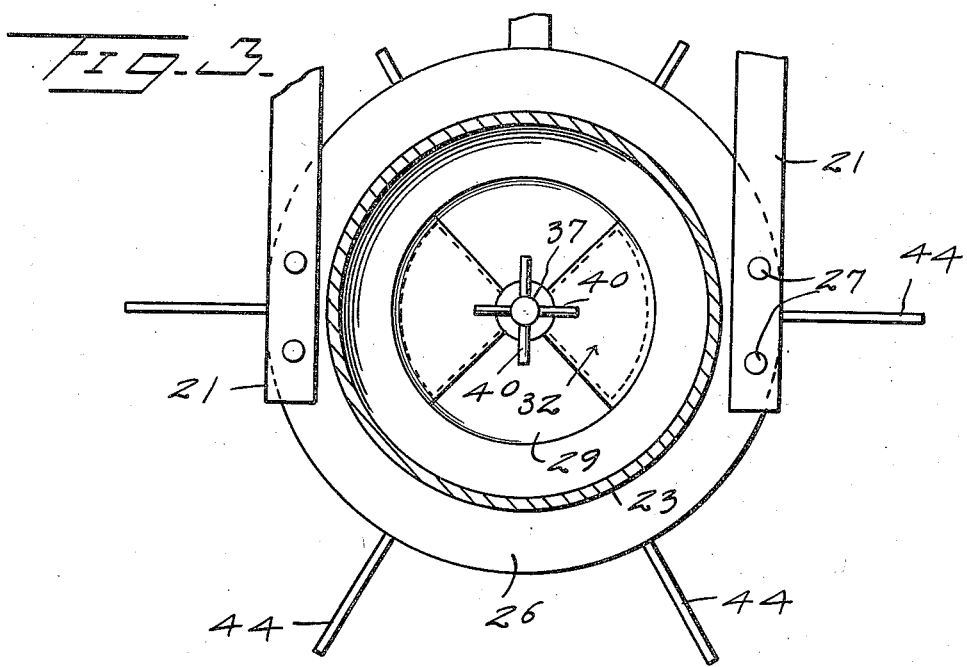

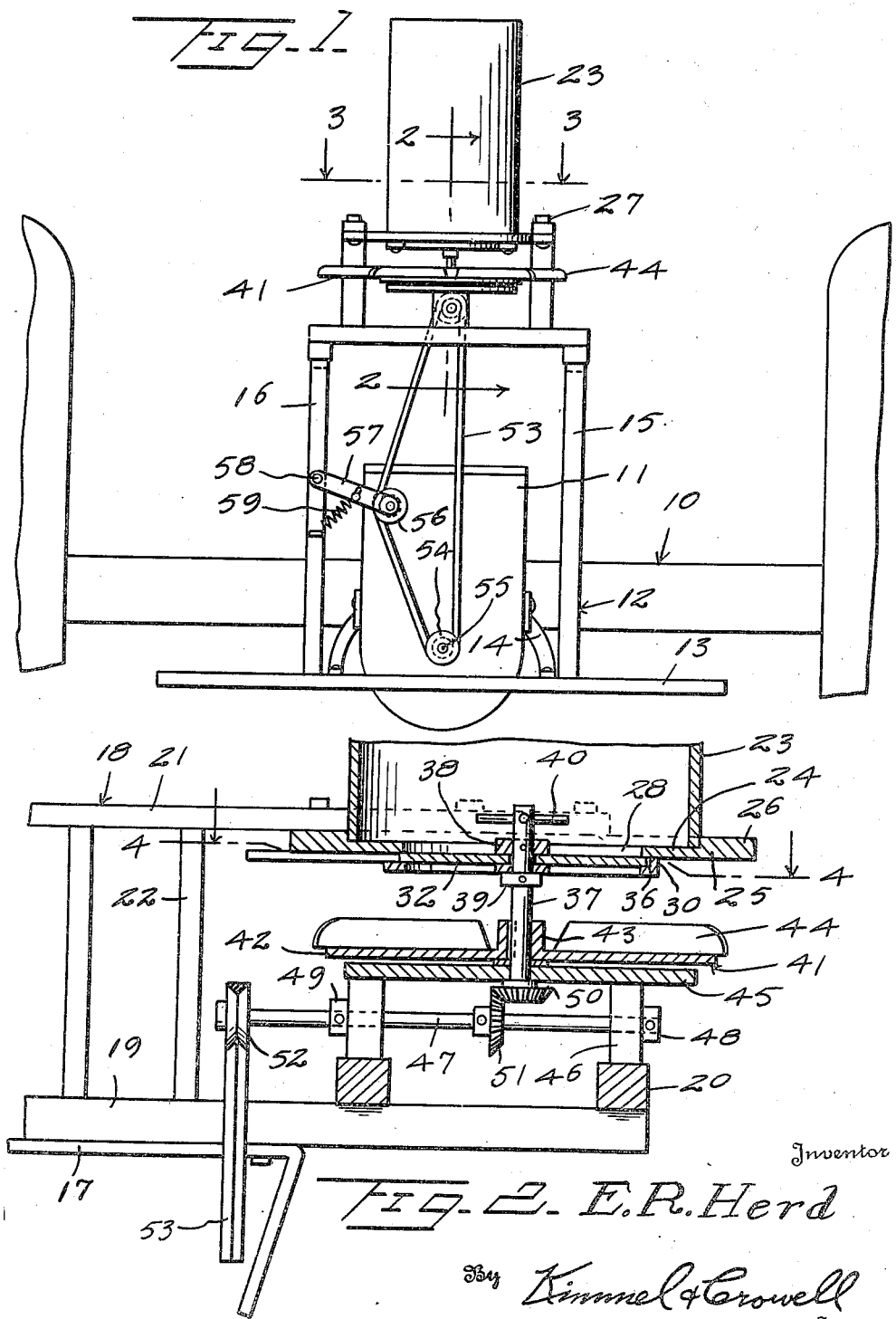

July 31, 1951 — E. R. HERD — 2,562,422
SEEDER
Filed April 1, 1947 — 2 Sheets-Sheet 2

Inventor
E. R. Herd
By Kimmel & Crowell
Attorneys

Patented July 31, 1951

2,562,422

UNITED STATES PATENT OFFICE 2,562,422

SEEDER

Elmer R. Herd, Royal Center, Ind.

Application April 1, 1947, Serial No. 738,622

1 Claim. (Cl. 275—8)

This invention relates to a powered seeder attachment for tractors or the like.

An object of this invention is to provide an improved power operated seeder which can be mounted as an attachment on the rear end of a tractor for broadcasting seed as the tractor moves over the ground.

Another object of this invention is to provide an attachment of this kind, including an improved means for operatively connecting the rotating broadcaster with the power take-off of the tractor.

A further object of this invention is to provide an improved power seeder which is of simple construction and can be easily and quickly mounted on or removed from the rear of the tractor.

With the above and other objects in view, my invention consists in the arrangement, combination and details of construction disclosed in the drawings and specification, and then more particularly pointed out in the appended claim.

Figure 4:
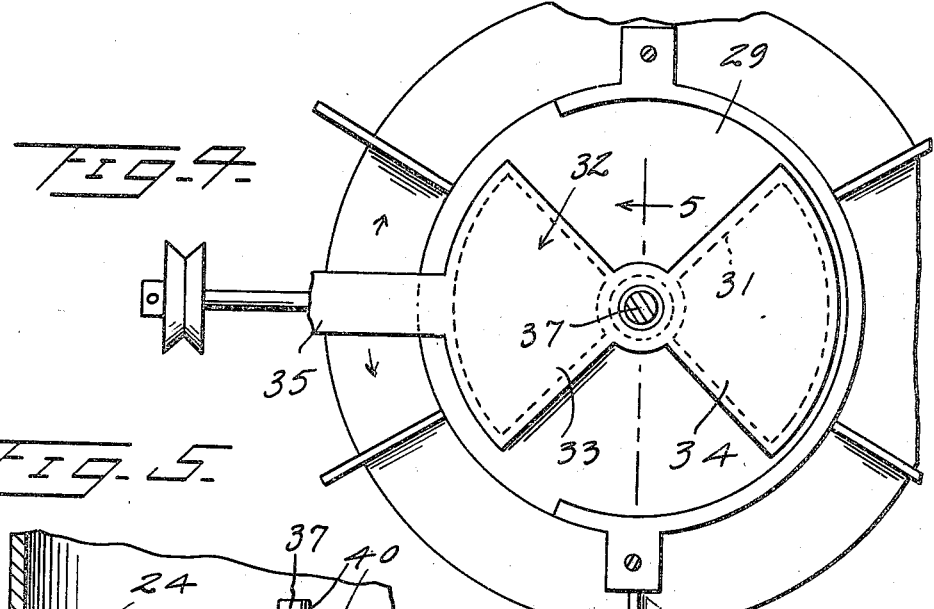
Figure 5:
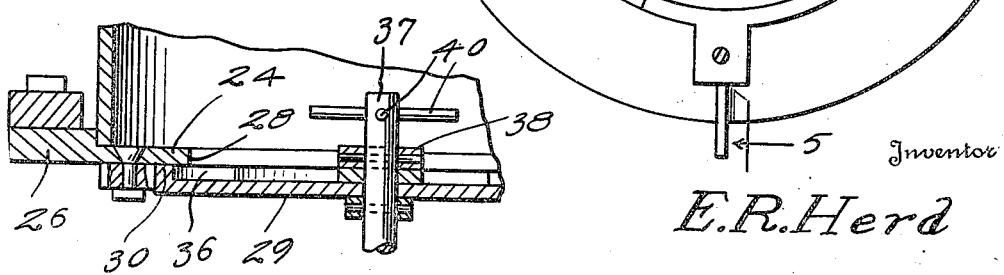

In the drawings,

Figure 1 is a detail rear elevation of a powered seeder constructed according to an embodiment of this invention, showing the device in applied position on the rear of the tractor, the tractor being shown in fragmentary rear elevation, Figure 2 is a fragmentary sectional view taken on the line 2—2 of Figure 1, Figure 3 is a fragmentary sectional view taken on the line 3—3 of Figure 1, Figure 4 is a fragmentary sectional view taken on the line 4—4 of Figure 2, Figure 5 is a fragmentary sectional view taken on the line 5—5 of Figure 4.

Referring to the drawings, the numeral 10 designates generally a tractor which has a power take-off housing 11 and shaft 55 at the rear thereof. A supporting frame generally designated as 12 is secured to the rear of the tractor 10 and includes a lower frame member 13 disposed in horizontal position and secured by downwardly and laterally extending brackets 14 to the power take-off housing 11.

The lower frame member 13 may be constructed in the form of a flat plate or board and this lower frame member 13 has extending upwardly therefrom a pair of supporting bars 15 and 16. The supporting bars 15 and 16 extend upwardly and rearwardly from the lower frame member 13 and are formed at their upper ends with forwardly extending supporting bars 17.

A hopper supporting frame generally designated as 18 is mounted on the horizontal supporting members 17, and projects partly rearwardly from the upwardly extending bars 15 and 16, as shown in Figure 2. The hopper supporting frame 18 includes a pair of longitudinal bars 19 connected together by transverse bars 20. A pair of upper horizontal bars 21 are disposed above the bars 19, being supported thereabove by upright supporting bars 22.

A hopper 23 is secured to the rear ends of the upper horizontal bars 21, the hopper 23 being formed with a bottom plate 24 formed with a rabbeted portion 25 within which the lower end of the hopper 23 is adapted to engage. The bottom plate 24 projects outwardly from the side of the hopper 23, as shown at 26, and the projecting wall portion 26 is adapted to be secured by fastening members 27 to the upper horizontal bars 21. The bottom plate 24 is formed with a relatively large central opening 28 and a lower apertured valve plate 29, having an annular flange 30, is secured to the lower side of the bottom plate 24.

The lower plate 29 is formed with a pair of segmental discharge openings 31 which are adapted to be opened or closed by adjustment of a valve generally designated as 32. The valve 32 is formed of a pair of segmental shaped valve plates 33 and 34 which are moved to open or closed position relative to the openings 31 by means of an operating lever 35. The valve member 32 engages in the channel 36 which is formed by the annular flange 30.

A vertically disposed shaft 37 is journaled through the valve plate or member 32 and the shaft 37 is provided with upper and lower collars 38 and 39 to hold the shaft 37 against vertical endwise movement. The shaft 37 within the hopper 23 has a plurality of agitating members 40 secured thereto for agitating the seed in the lower portion of the hopper as the shaft 37 rotates. The shaft 37 has fixed thereto a seed broadcasting member generally designated as 41. The broadcasting member 41 is constructed in the form of a disc-shaped plate 42, having a hub or bushing 43 secured to the shaft 37.

A plurality of radially extending blades 44 are secured to the upper side of the disc 42 and are adapted to throw the seed outwardly, which drops through the openings 31, for broadcasting the seed, as shaft 37 rotates. Shaft 37 also extends through a plate 45 which is disposed above the transverse bars 20, being supported above the bars 20 by means of interposed blocks 46. The blocks 46 constitute bearings for a horizontal drive shaft 47 which is held against endwise movement by means of a pair of collars 48 and 49.

The lower end of the shaft 37 has a bevel gear 50 secured thereto and the shaft 47 has a gear 51 secured thereto, meshing with the gear 50. A pulley 52 is fixed to the horizontal shaft 47 and a belt or flexible drive member 53 is trained over the pulley 52 and is also trained about a lower pulley 54 secured to the power take-off shaft 55.

In order to provide for holding the belt 53 tight during the operation thereof, I have provided a belt tensioner, including an idler pulley 56 which is rotatably carried by a pivoted arm or link 57, pivotally secured as at 58, to the upright support 16. A spring 59 constantly urges the lever or link 57 downwardly so as to maintain the belt 53 tight and prevent slippage on the drive pulley 54 and the driven pulley 52.

In the use and operation of this device, the attachment is secured by means of the supporting brackets 14 to the power take-off housing 11 at the rear of the tractor 10. The upper horizontal frame bars 17 may be extended forwardly for securing to a forward portion of the tractor so that the hopper frame 18 will be firmly supported from the tractor. The belt 53 is trained about the driving pulley 54, which is secured to the take-off shaft 55. Seed is placed in the hopper 23 and upon opening of the valve 32 the seed will drop downwardly onto the rotating broadcaster 41 which will centrifugally broadcast the seed upon the ground.

I do not mean to confine myself to the exact details of construction herein disclosed, but claim all variations falling within the purview of the appended claim.

What I claim is:

A powered seeder attachment for a tractor having a power take-off pulley extending rearwardly, comprising a lower horizontal frame member, a hopper frame formed of a pair of longitudinally disposed parallel bars, a pair of transverse bars secured to said longitudinal bars, a pair of supporting bars secured between said lower frame member and said longitudinal bars, aligned bearing brackets secured to said transverse bars, a horizontal shaft journalled in said bearing brackets, a pulley on said shaft in vertical alignment with the power take-off pulley, a belt trained over said pulleys, a plate mounted on said bearing brackets, a vertically disposed shaft journalled through said plate, meshing gears secured to said horizontal and vertical shafts, a hopper, means supporting said hopper from said hopper frame, said vertical shaft projecting into the lower end of said hopper, a broadcasting member fixed to said vertical shaft between the lower end of said hopper and said plate, valve means carried by said hopper for regulating the discharge of material from said hopper onto said broadcasting member, and a spring-pressed belt tensioner carried by one of said supporting bars.

ELMER R. HERD.

REFERENCES CITED

The following references are of record in the file of this patent:

UNITED STATES PATENTS

| Number    | Name        | Date          |
|-----------|-------------|---------------|
| 1,348,130 | Hevel et al. | July 27, 1920 |
| 1,420,716 | Linscheid   | June 27, 1922 |
| 2,327,266 | Hoffstetter | Aug. 17, 1943 |
| 2,334,376 | Bauer       | Nov. 16, 1943 |
| 2,340,657 | Goertzen    | Feb. 1, 1944  |
| 2,421,211 | Lutz        | May 27, 1947  |
| 2,463,855 | Crawford    | Mar. 8, 1949  |